(12) United States Patent
Trim et al.

(10) Patent No.: US 12,093,436 B2
(45) Date of Patent: Sep. 17, 2024

(54) AI PRIVACY INTERACTION METHODS FOR SMART GLASSES

(71) Applicant: INTERNATIONAL BUSINESS MACHINES CORPORATION, Armonk, NY (US)

(72) Inventors: Craig M. Trim, Ventura, CA (US); John M. Ganci, Jr., Raleigh, NC (US); Hernan A. Cunico, Holly Springs, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 17/113,471

(22) Filed: Dec. 7, 2020

(65) Prior Publication Data

US 2022/0180008 A1 Jun. 9, 2022

(51) Int. Cl.
| | | |
|---|---|---|
| *G06F 21/62* | (2013.01) | |
| *G06F 21/31* | (2013.01) | |
| *G06F 21/83* | (2013.01) | |
| *G06F 21/84* | (2013.01) | |
| *G06T 11/00* | (2006.01) | |
| *G06F 3/042* | (2006.01) | |
| *G06F 3/0488* | (2022.01) | |

(52) U.S. Cl.
CPC ............. *G06F 21/84* (2013.01); *G06F 21/31* (2013.01); *G06F 21/83* (2013.01); *G06T 11/00* (2013.01)

(58) Field of Classification Search
CPC .......... G06F 21/84; G06F 21/31; G06F 21/83; G06T 11/00; G02B 27/017
See application file for complete search history.

(56) References Cited

U.S. PATENT DOCUMENTS

| | | |
|---|---|---|
| 6,512,607 B1 | 1/2003 | Windsor |
| 9,104,886 B1 | 8/2015 | Dolbakian |

(Continued)

FOREIGN PATENT DOCUMENTS

| | | | |
|---|---|---|---|
| EP | 2887253 A1 | 6/2015 | |
| WO | WO-2023086637 A1 * | 5/2023 | ......... G02B 27/0093 |

OTHER PUBLICATIONS

Liang Song; Xing Hu; Guanhua Zhang; Petros Spachos; Konstantinos N. Plataniotis; Hequan Wu; Networking Systems of AI: On the Convergence of Computing and Communications; IEEE Internet of Things Journal; Year: Oct. 2022 | vol. 9, Issue: 20 | Journal Article | Publisher: IEEE; pp. 20352-20381 (Year: 2022).*

(Continued)

*Primary Examiner* — Fatoumata Traore
*Assistant Examiner* — Courtney D Fields
(74) *Attorney, Agent, or Firm* — Robert D. Bean (57) ABSTRACT

According to one embodiment, a method, computer system, and computer program product for selecting methods of interfacing between a smart headset and a user based on privacy risk is provided. The present invention may include determining a privacy context of the smart headset based on the location, surrounding environment, and content associated with a smart headset, selecting at least one output method and at least one input method compatible with the smart headset based on the security of the output method and the input method within the privacy context, and operating the smart headset to interface with a user using the at least one output method and the at least one input method.

12 Claims, 7 Drawing Sheets

(56) References Cited

U.S. PATENT DOCUMENTS

| | | | |
|---|---|---|---|
| 9,164,284 B2 | 10/2015 | Olsson | |
| 9,613,217 B2 | 4/2017 | Bostick | |
| 11,567,788 B1* | 1/2023 | Khemka | H04L 67/55 |
| 2016/0109954 A1* | 4/2016 | Harris | G06F 3/0482 |
| | | | 345/156 |
| 2016/0132721 A1 | 5/2016 | Bostick | |
| 2016/0275270 A1 | 9/2016 | Bostick | |
| 2017/0040002 A1 | 2/2017 | Basson | |
| 2017/0163578 A1 | 6/2017 | Deluca | |
| 2018/0088527 A1 | 3/2018 | Bostick | |
| 2018/0173866 A1 | 6/2018 | Williams | |
| 2018/0341779 A1 | 11/2018 | Sawant | |
| 2020/0004016 A1* | 1/2020 | Gross | G02B 27/017 |
| 2020/0184080 A1 | 6/2020 | Trim | |

OTHER PUBLICATIONS

Wikipedia, "Smartglasses", printed Dec. 4, 2020, 16 pages, https://en.wikipedia.org/wiki/Smartglasses.

IBM, "Financial Services", Research, printed Dec. 4, 2020, 6 pages, https://research.ibm.com/financial-services/.

Smart Glasses Hub, "How do smart glasses work?", printed Dec. 4, 2020, 17 pages, https://smartglasseshub.com/how-do-smart-glasses-work/.

Haselton, "There's a race to replace our iPhones with smart glasses we wear everywhere", CNBC, Nov. 11, 2019, 15 pages, https://www.cnbc.com/2019/11/11/smart-glasses-that-replace-phones-may-be-the-next-hottest-tech-trend.html.

IBM, "Banking Analytics", printed Dec. 4, 2020, 4 pages, https://www.ibm.com/analytics/sg/en/industry/banking-solutions/.

IBM, "Build smarter mobile services and applications using IBM Cloud", printed Dec. 7, 2020, 3 pages, https://www.ibm.com/mobile.

IBM, "IBM Security", printed Dec. 4, 2020, 2 pages, https://www.ibm.com/security.

IBM, "Using AI to understand global opinions", IBM Watson, printed Dec. 4, 2020, 5 pages, https://www.ibm.com/watson.

IBM, "Watson Health is smarter health", IBM Watson, printed Dec. 4, 2020, 4 pages, https://www.ibm.com/watson-health.

Mell et al., "The NIST Definition of Cloud Computing", Recommendations of the National Institute of Standards and Technology, NIST Special Publication 800-145, Sep. 2011, 7 pages.

IBM Research, "Future of Finance," IBM.com [overview], [accessed on Oct. 6, 2022], 5 pages, Retrieved from the Internet: < URL: https://research.ibm.com/topics/future-of-finance>.

Rakver, "How Do Smart Glasses Work?" Smart Glasses Hub [online], [accessed on Oct. 6, 2022], 17 pages, Retrieved from the Internet: <URL: https://smartglasseshub.com/how-do-smart-glasses-work/>.

* cited by examiner

AI PRIVACY INTERACTION METHODS FOR SMART GLASSES

BACKGROUND

The present invention relates, generally, to the field of computing, and more particularly to smart headsets.

Smart headsets are specialized wearable computing devices which overlay computer generated elements onto a wearer's view of the real world by projecting or mapping digital objects onto a lens in front of the wearer's eyes. Smart headsets are particularly well suited as hardware platforms for augmented reality (AR), which is a computing technology that uses software to merge real and virtual worlds such that physical and digital objects co-exist and interact in real time. An AR system might generate images, sounds, haptic feedback, and other sensations that are associated or merged with real-world elements to produce an augmented environment that is a fusion of physical and virtual environments; with the help of computer augmentation, information about the surrounding world of the user, as well as other digital elements overlaid onto the world, become interactive and digitally manipulable. This technology has the potential to transform countless aspects of everyday modern life, from social networking to performing tasks to navigation to recreation. As such, smart headsets have the potential to compliment or even replace popular modern mobile devices such as smart phones and watches.

SUMMARY

According to one embodiment, a method, computer system, and computer program product for selecting methods of interfacing between a smart headset and a user based on privacy risk is provided. The present invention may include determining a privacy context of the smart headset based on the location, surrounding environment, and content associated with a smart headset, selecting at least one output method and at least one input method compatible with the smart headset based on the security of the output method and the input method within the privacy context, and operating the smart headset to interface with a user using the at least one output method and the at least one input method.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to smart headsets. The following described exemplary embodiments provide a system, method, and program product to, among other things, select a method for interaction between a user and a smart headset based on a dynamic assessment of the privacy risk associated with the user's location, people or objects in the environment, and content being accessed. Therefore, the present embodiment has the capacity to improve the technical field of smart headsets by providing a method and system to allow a user to safely and securely access private information using a smart headset.

As previously described, augmented reality (AR) is a computing technology that uses software to merge real and virtual worlds such that physical and digital objects co-exist and interact in real time. An AR system might generate images, sounds, haptic feedback, and other sensations that are associated or merged with real-world elements to produce an augmented environment that is a fusion of physical and virtual environments. While the creation of this augmented environment can be achieved with general-purpose computing devices, such as modern smart phones, more specialized equipment is also used, typically in the form of glasses or headsets where computer generated elements are overlaid onto a view of the real world by being projected or mapped onto a lens in front of a user's eyes. With the help of computer augmentation, information about the surrounding world of the user, as well as other digital elements overlaid onto the world, become interactive and digitally manipulable. This technology has the potential to transform countless aspects of human life, from construction to military training to space exploration.

However, smart headsets pose a challenge; while some smart headsets can include a touch area on the frame for input or navigation, they do not have an integrated keyboard for text input. The primary method of input for smart glasses is voice or gesture, which presents contextual privacy issues. The keyboards of smart phones provide a discrete and easily shielded method of providing input to the device, which offers a level of privacy that is not natively available to smart headsets. The primary options for providing input to a smart headset is through audible speech or gestures; however, speech input to a smart headset can be overheard by people or recording devices in the surrounding area depending on the volume of the speech input and their proximity to the user, and gestures can likewise be seen and identified by nearby people or cameras with line of sight to the user.

Additionally, alternate input methods may be available, such as keyboard-equipped smart devices paired with the smart headset, or pico projectors integrated into the smart headset capable of projecting keyboards; these options may be less convenient for interfacing with the smart headset, but may be necessary depending on the privacy situation in the user's surrounding area. In addition to the input methods, the smart headset may interact with a user using output methods such as speech and displayed text or graphical elements; however, speech output from the smart headset may likewise be overheard in the absence of audio headphones. As such, it may be advantageous to, among other things, implement a system that continuously tracks the surrounding environment of the user wearing the smart headset to assess the privacy context in real time, and modifies input and output methods for the smart headset depending on the location, surroundings, and the sensitivity of data being accessed to protect the privacy of a user and his or her sensitive information.

According to at least one embodiment, the invention is a system for continuously monitoring the surrounding environment of a user wearing a smart headset to determine a privacy risk, and modifying how the smart headset interfaces with the user based on the privacy risk.

In some embodiments, the system may be configured by receiving a mapping of inputs and/or outputs for different privacy contexts from a user and/or from a machine learning model, and receiving a privacy risk for one or more locations, one or more surroundings, and one or more apps or content elements from a user or from a machine learning model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to select a method for interaction between a user and a smart headset based on a dynamic assessment of the privacy risk associated with the user's location, people or objects in the environment, and content being accessed.

Figure 1:
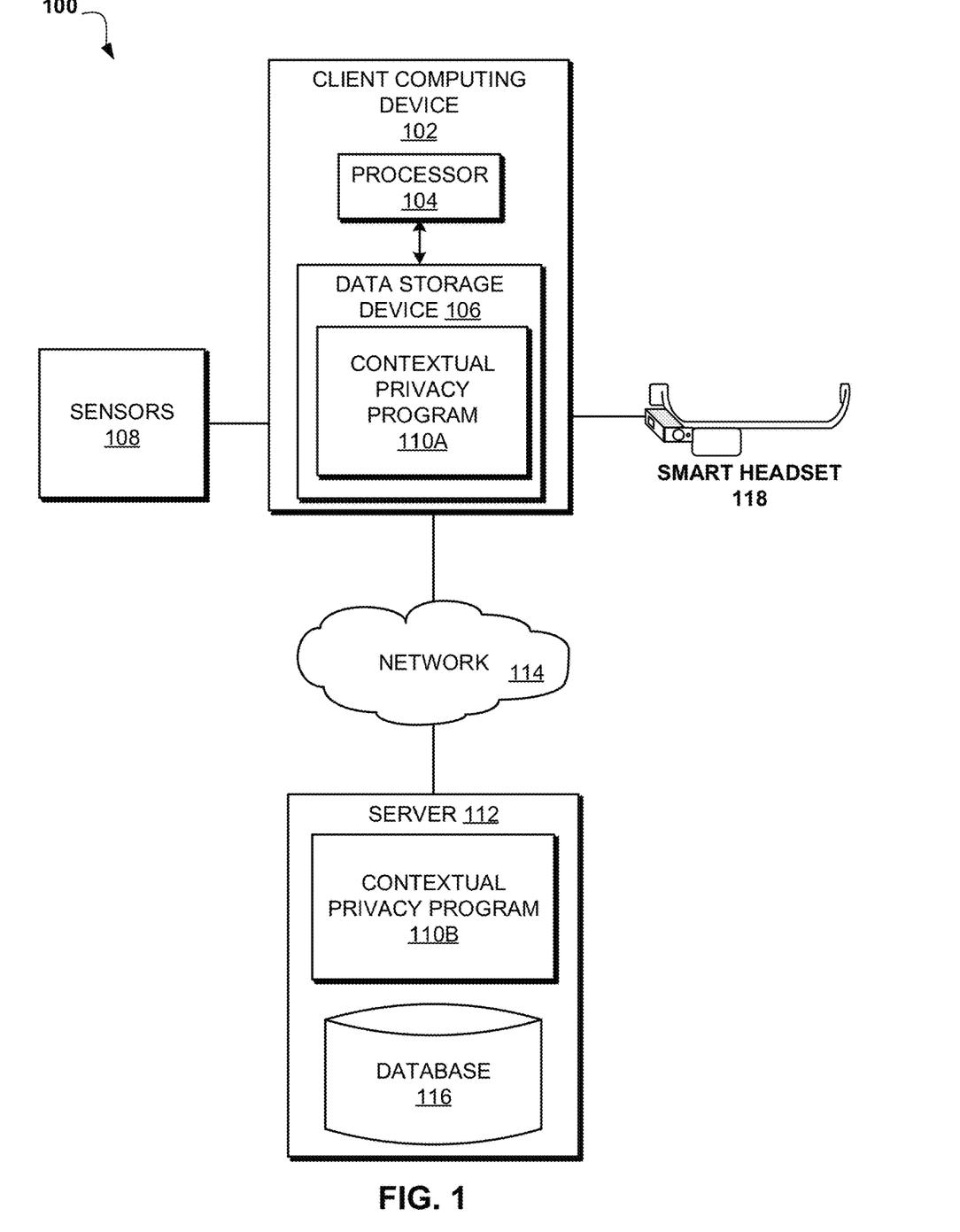
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a contextual privacy program 110A and communicate with the server 112 via the communication network 114, in accordance with one embodiment of the invention. Client computing device 102 may be a mobile device, a telephone, a personal digital assistant, a netbook, a laptop computer, a tablet computer, a desktop computer, or any type of computing device capable of running a program and accessing a network. In some embodiments of the invention, client computing device may be integrated into smart headset 118, or may be paired with or otherwise in communication with smart headset 118. As will be discussed with reference to FIG. 6, the client computing device 102 may include internal components 602a and external components 604a, respectively.

Sensors 108 may be one or more devices capable of recording data on the location and surrounding environment of smart headset 118 and communicating with contextual privacy program 110A, 110B directly or via network 114. Sensors 108 may include cameras, microphones, accelerometers, location sensors, et cetera. Sensors 108 may be integrated into smart headset 118 and/or client computing device 102, and/or may be any sensors within a geographical proximity of smart headset 118; for example, sensors 108 may include the integrated camera of a smartphone and security cameras observing the location that the smart headset 118 is currently in. In some embodiments of the invention, sensors 108 may include at least one camera mounted on the smart headset 118 in line with the facing of the smart headset 118, such that the camera provides a reasonable approximation of what the user is seeing. In some embodiments the sensors 108 may include at least a microphone and a camera integrated into smart headset 118. In some embodiments of the invention, sensors 108 may include sensors for gathering data, such as biometric information or interfacing data, on or from the user, such as a user-facing camera on smart headset 118, fingerprint scanners, vitality trackers, touch sensors, et cetera.

The server computer 112 may be a laptop computer, netbook computer, personal computer (PC), a desktop computer, or any programmable electronic device or any network of programmable electronic devices capable of hosting and running a contextual privacy program 110B and a database 116 and communicating with the client computing device 102 via the communication network 114, in accordance with embodiments of the invention. As will be discussed with reference to FIG. 6, the server computer 112 may include internal components 602b and external components 604b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The smart headset 118 may be a piece of hardware designed to be worn on the head of the user, and is equipped with one or more interface devices to communicate output to user, including a speaker and/or a display device, and one or more interface devices including sensors 108 to receive input from a user, including microphones, cameras, motion sensors, touchpads, buttons, et cetera. The smart headset 118 may be integrated into or in communication with client computing device 102, and/or may be enabled to communicate with the server 112 via the communication network 114. The smart headset 118 may be discussed in greater detail with respect to FIG. 4.

According to the present embodiment, the contextual privacy program 110A, 110B may be a program enabled to select a method for interaction between a user and a smart headset based on a dynamic assessment of the privacy risk associated with the user's location, people or objects in the environment, and content being accessed. The contextual privacy may be located on client computing device 102 or server 112 or on any other device located within network 114. Furthermore, contextual privacy may be distributed in its operation over multiple devices, such as client computing device 102 and server 112. The contextual privacy method is explained in further detail below with respect to FIG. 2.

Figure 2:
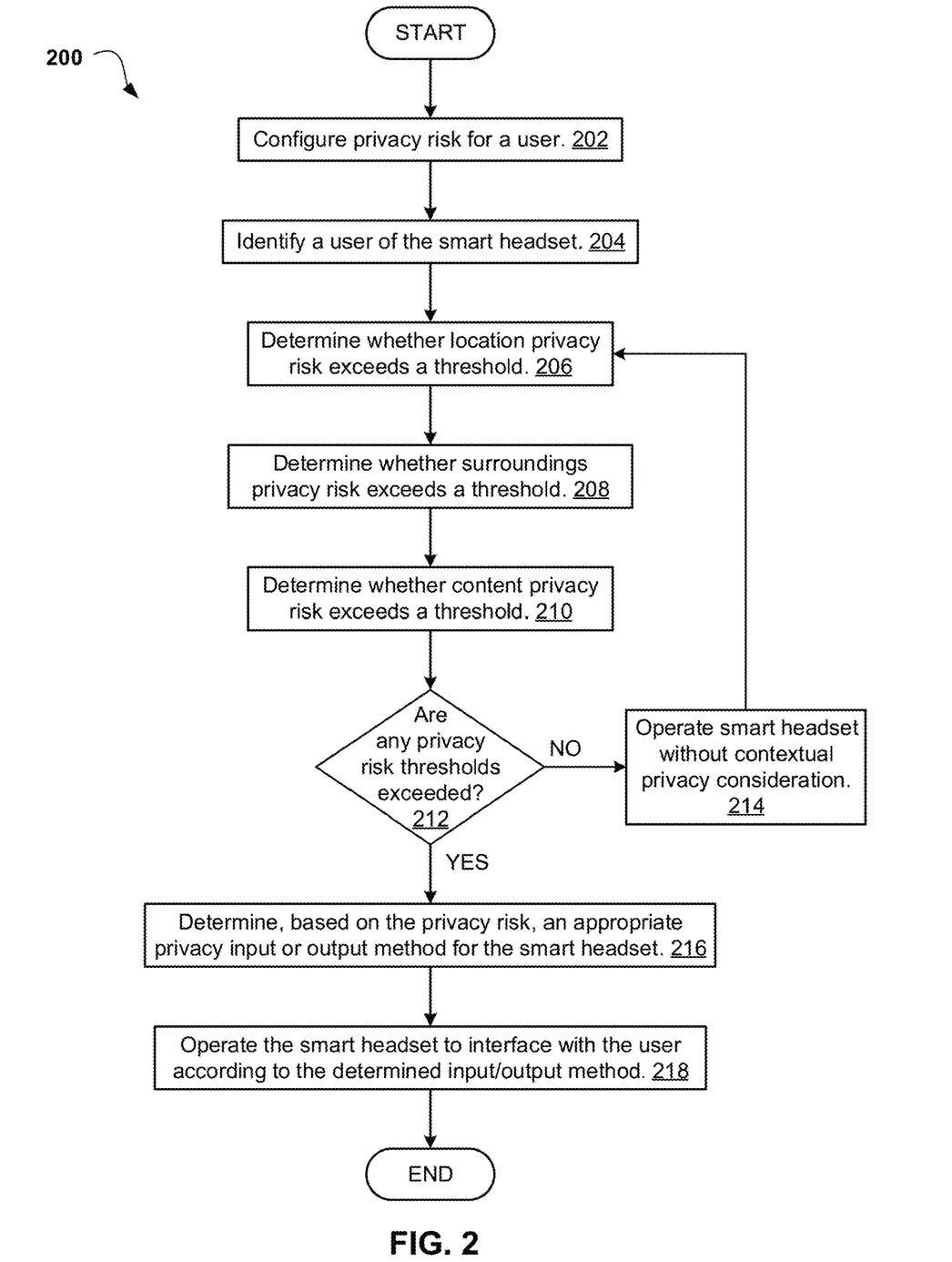
FIG. 2 is an operational flowchart illustrating a contextual privacy process according to at least one embodiment.

Referring now to FIG. 2, an operational flowchart illustrating a contextual privacy process 200 is depicted according to at least one embodiment. At 202, the contextual privacy program 110A, 110B configures privacy risk for a user. Configuring privacy risk for a user may include creating baseline configuration settings quantifying the privacy risks associated with locations, individuals and/or objects that contextual privacy program 110A, 110B may identify within its local environment, and data that the user may be attempting to access or communicate. Configuring privacy risk may further entail identifying different output or input methods for the contextual privacy program 110A, 110B to enable or disable based on the determined privacy risks. While in some embodiments contextual privacy program 110A, 110B may perform the step of configuring the privacy risk as an initial step prior to the regular operation of contextual privacy program 110A, 110B, and/or may only perform the step once, contextual privacy program 110A, 110B may continually update the configuration settings at any time based on new feedback or data that may improve the performance of contextual privacy program 110A, 110B. Configuring privacy risk for a user may be explained in further detail below with respect to FIG. 3.

At 204, the contextual privacy program 110A, 110B identifies a user of the smart headset. The contextual privacy program 110A, 110B may identify a user of the smart headset 118 by using sensors 108 in conjunction with any of a number of authentication techniques. For example, contextual privacy program 110A, 110B may utilize voice recognition and identification methods to match voice data recorded by sensors 108 with a corresponding user from a list of users. The contextual privacy program 110A, 110B may identify a user of the smart headset where sensors 108 include an inward facing camera to recognize identifying biometric features of the wearer, such as facial features, retinas, et cetera and compare these features against a database of biometric features to identify a corresponding user. Once a user has been identified, contextual privacy program 110A, 110B may retrieve and apply configuration settings corresponding with the identified user.

In some embodiments of the invention, contextual privacy program 110A, 110B may implement a smart headset captcha process to discriminate between human and spambot interactions. The smart headset captcha process may include contextual privacy program 110A, 110B extracting one or more visible objects from camera feeds of sensors 108 that are mounted in-line or approximately in-line with the facing of smart headset 118 so as to correspond with the vision of the user. The contextual privacy program 110A, 110B may extract one or more fake objects, which is to say objects that are not visible objects and which are not visible to the user, from one or more repositories and/or from other sources such as video feeds from other cameras in the environment, online maps, images, et cetera. The contextual privacy program 110A, 110B may then present the user with a plurality of objects including a number of visible objects and a number of fake objects on a display device, wherein each object may be a visible object or a fake object, and asking the user to correctly identify whether each or some subset of the objects are visible objects or fake objects. In some embodiments, for example where the smart headset 118 is equipped with augmented-reality (AR) capabilities, the contextual privacy program 110A, 110B may overlay one or more fake objects into the physical environment, and places graphical elements highlighting one or more visible objects and the one or more fake objects overlaid onto the real environment of the user. Augmented reality graphical elements, as referred to herein, may be referring to graphical elements that are anchored to one or more locations within the physical world, such that their locations appear fixed relative to the movement of the graphical headset 118. If the user correctly identifies a number of visible and/or fake objects exceeding a threshold, contextual privacy program 110A, 110B may authenticate the user as a human user, as opposed to a spambot or software agent. This authentication may be provided to apps or webpages that request captchas, to allow the user to access such apps and webpages after a single captcha authentication method, removing the need for the user to perform multiple instances of captcha authentication.

At 206, the contextual privacy program 110A, 110B may determine whether the location privacy risk exceeds a threshold. The contextual privacy program 110A, 110B may, utilizing sensors 108 and location methods, identify the location of the smart headset 118 based on location data. The contextual privacy program 110A, 110B may gather location data utilizing some number and/or combination of geolocation features available in the client computing device 102 or smart headset 118, where geo location features may be software agents capable of deducing the geographical location of a device connected to the Internet, for example using the IP address, MAC address, et cetera. The contextual privacy program 110A, 110B may additionally or alternatively gather location data using sensors 108 and/or other hardware such as global positioning systems, near field communications systems, Bluetooth, RFID tags, beacons, cameras, motion detectors, laser rangefinders, et cetera. Based on the location data, contextual privacy program 110A, 110B may determine the location of smart headset 118, and may access the configuration settings pertaining to the user to look up the privacy risk corresponding with the determined location.

In situations where the location is still unknown or undefined in the configuration settings, the contextual privacy program 110A, 110B may utilize location data and maps data to identify the location as falling within one or more general predefined categories, such as a business, a home, a public space, et cetera, each being assigned a default privacy risk value. Additionally or alternatively, the contextual privacy program 110A, 110B may prompt the user, using textual, graphical, and/or augmented reality elements, to identify the location, and/or provide a privacy risk of the location. For locations that cannot be identified, the contextual privacy program 110A, 110B may assign a high privacy risk. The contextual privacy program 110A, 110B may then compare the location privacy risk enumerated within the configuration settings against a location privacy risk threshold, where the location privacy risk threshold is a value of privacy risk representing the maximum amount of location privacy risk that may be present before the user's privacy can be considered to be in sufficient danger to merit modification of input/output methods. In some embodiments of the invention, contextual privacy program 110A, 110B may continuously determine whether the location privacy risk exceeds the location privacy risk threshold, calculating the location of the smart headset 118 and the related privacy risk in relation to the location privacy risk threshold and otherwise in real time or near-real-time.

At 208, the contextual privacy program 110A, 110B may determine whether the surroundings privacy risk exceeds a threshold. The contextual privacy program 110A, 110B may use sensors 108 to measure the surroundings of the smart headset 118; "surroundings" may be the people and objects within a threshold distance of smart headset 118, where the threshold distance may represent the furthest distance at which unguarded speech could be heard or unguarded gestures could be seen by third parties. The contextual privacy program 110A, 110B may use known techniques to measure the distance between a person or a device and the smart headset 118, and may determine whether that person or device falls within the threshold distance. In some embodiments, there may be a threshold distance corresponding to any number of different input or output methods, including speech, gestures, typing on a projected keyboard or a keyboard on the mobile device, et cetera, representing the distances at which the respective input or output method could be seen or overheard. The threshold distances may be taken from the configuration settings, and/or may be provided or adjusted based on the regular speaking volume of the user, the regular output volume of smart headset 118's speakers, threshold distances from other instances of contextual privacy program 110A, 110B, machine learning based on historical data, the maximum distance at which sensors 108 can identify people and/or objects, the maximum distance at which the sensors 108 can identify people and/or objects at a minimum level of accuracy, et cetera.

The contextual privacy program 110A, 110B may use microphones to perform passive listening to isolate human voices or the sounds of devices in the surroundings. The contextual privacy program 110A, 110B may use voice identification methods to determine an identity of one or more users in the surroundings corresponding with detected human voices. The contextual privacy program 110A, 110B may use connectivity methods (i.e. wifi, Bluetooth) to discover other mobile/IoT devices within proximity. The contextual privacy program 110A, 110B may also use image processing techniques to recognize humans, sensors such as microphones or cameras, and/or devices containing such sensors such as laptops, cell phones, robots, cars, et cetera in camera feeds of the surroundings. The contextual privacy program 110A, 110B may attempt to determine the identify of recognized humans using facial identification techniques. The contextual privacy program 110A, 110B may attempt to identify the facing direction and/or range of any recognized sensors or devices containing sensors, based on the model and/or type of sensor, historical data, configuration settings, user feedback, et cetera, to determine whether the smart headset 118 is within the range of the sensor. In some embodiments of the invention, contextual privacy program 110A, 110B may request that a user look in one or more directions to provide camera data where contextual privacy program 110A, 110B lacks camera data, and/or in directions where contextual privacy program 110A, 110B has recognized a voice but cannot identify the owner of the voice.

The contextual privacy program 110A, 110B may consult the configuration settings to determine a privacy risk associated with every person, sensor, sensor-containing device, et cetera within the surroundings of the smart headset 118. In situations where the people or devices are unknown or undefined in the configuration settings, the contextual privacy program 110A, 110B may highlight the unknown or undefined people and/or devices, and/or prompt the user, using textual, graphical, and/or augmented reality elements, to identify unknown people or devices, and/or provide a privacy risk. To people or devices that cannot be identified, the contextual privacy program 110A, 110B may assign a high surrounding privacy risk. The contextual privacy program 110A, 110B may add the privacy risks together, and compare against a surrounding privacy risk threshold, where the surrounding privacy risk threshold is a value of surrounding privacy risk representing the maximum amount of surrounding privacy risk that may be present before the user's privacy can be considered to be in sufficient danger to merit modification of input/output methods. In some embodiments of the invention, contextual privacy program 110A, 110B may continuously determine whether the surrounding privacy risk exceeds the surrounding privacy risk threshold, monitoring the people and devices in the surroundings of the smart headset 118 and the related privacy risk in relation to the surrounding privacy risk threshold and otherwise in real time or near-real-time.

At 210, the contextual privacy program 110A, 110B may determine whether the content privacy risk exceeds a threshold. The contextual privacy program 110A, 110B may analyze applications being run or content being accessed by the user on smart headset 118; the applications and content elements may be compared against a list of applications and content elements within the configuration settings to determine a privacy risk corresponding with each application or content element. If any of the applications or content elements being accessed by the user are unknown or undefined in the configuration settings, contextual privacy program 110A, 110B may utilize natural language processing techniques to identify text on pages of an application or webpage, and may use context analysis and/or a knowledge base of common fields such as social security numbers, phone numbers, account numbers, et cetera, to determine a content privacy risk of a given application or content element. Alternatively or in addition, contextual privacy program 110A, 110B may prompt a user to identify an unknown content element or application, and/or to indicate a corresponding privacy risk or privacy classification. To content or applications that cannot be identified, the contextual privacy program 110A, 110B may assign a high privacy risk.

The privacy risk of the applications or content elements may be compared individually or added together against a content privacy risk threshold, where the content privacy risk threshold is a value of content privacy risk representing the maximum amount of content privacy risk that may be present before the user's privacy can be considered to be in sufficient danger to merit modification of input/output methods. In some embodiments of the invention, contextual privacy program 110A, 110B may continuously determine whether the surrounding content risk exceeds the content privacy risk threshold, monitoring the applications and content elements accessed by the user on smart headset 118 and the related privacy risk in relation to the content privacy risk threshold and otherwise in real time or near-real-time.

Then, at 212, the contextual privacy program 110A, 110B determines whether any privacy risk thresholds were exceeded. The contextual privacy program 110A, 110B may monitor the location privacy risk, the surroundings privacy risk, and the content privacy risk at regular intervals or in real time or near real time. According to one implementation, if the contextual privacy program 110A, 110B (step 212, "NO" branch), does not determine that any of the three privacy risks have exceeded their respective privacy risk thresholds, the contextual privacy program 110A, 110B may continue to step 214 to operate the smart headset 118 without contextual privacy consideration. If the contextual privacy program 110A, 110B determines that any of the three privacy risks have exceeded their respective privacy risk thresholds (step 212, "YES" branch), the contextual privacy program 110A, 110B may continue to step 216 to determine, based on the privacy risk, an appropriate privacy input or output method for the smart headset. In some embodiments of the invention, the contextual privacy program 110A, 110B may add together the location privacy risk, surroundings privacy risk, and content privacy risk and compare the combined privacy risk value against a total privacy risk threshold, where the total privacy risk threshold is a value of privacy risk representing the maximum amount of combined privacy risk that may be present before the user's privacy can be considered to be in sufficient danger to merit modification of input/output methods.

At 214, the contextual privacy program 110A, 110B operates the smart headset 118 without contextual privacy consideration. Here, the contextual privacy program 110A, 110B utilizes the unmodified default input and output methods of the smart headset 118 selected by the user, and continues monitoring privacy risk.

At 216, the contextual privacy program 110A, 110B determines, based on the privacy risk, an appropriate privacy input or output method for the smart headset. Here, the contextual privacy program 110A, 110B consults the configuration settings to look up the privacy context corresponding with the given values of location privacy risk, surroundings privacy risk, and location privacy risk and to determine which modification or modifications to the input and/or output methods are associated with the privacy context. In some embodiments of the invention, for example where the contextual privacy program 110A, 110B combines all of the location privacy risk, surroundings privacy risk, and content privacy risk into a combined privacy risk, the contextual privacy program 110A, 110B may consult the configuration settings to determine a privacy context associated with the combined privacy risk, or a privacy context pertaining to the combination of location privacy risk, surroundings privacy risk, and content privacy risk, and combined privacy risk, and the corresponding input/output modifications.

At 218, the contextual privacy program 110A, 110B operates the smart headset 118 to interface with the user according to the determined input/output method. Once one or more modifications to the input and/or output methods have been identified, contextual privacy program 110A, 110B operates the smart headset 118 to implement the modifications. The contextual privacy program 110A, 110B may inform the user of the privacy risk levels, the modifications being made, and/or instructions on how to interface with the smart headset 118 to preserve privacy according to the modified input/output scheme. Where the one or more modifications include modifications to the output methods including whispered speech, contextual privacy program 110A, 110B may implement the changes to the output methods immediately and then inform the user of the changes using the changed output methods. and smart headset 118 is equipped with one or more speakers and noise cancellation functionality, contextual privacy program 110A, 110B may project noise-cancellation beyond the smart headset 118, such that users or devices within the surroundings are less likely to hear the whispered speech from the user.

Where the one or more modifications include modifications to the input methods, contextual privacy program 110A, 110B may communicate with the user, using output methods modified to correspond with the privacy risk, to alert the user to the presence and/or magnitude of a privacy risk, and/or to apprise the user of the necessity of communicating input to the smart headset 118 in a particular way so as to preserve privacy, and/or to instruct the user on how to communicate input to the smart headset 118 so as to preserve privacy. If the user attempts to interface with the contextual privacy program 110A, 110B in a manner that is not secure, the contextual privacy program 110A, 110B may warn the user, and/or block or restrict access to content or applications with security classifications. In some embodiments, for example where the smart headset 118 is linked with a mobile device equipped with a display, the contextual privacy program 110A, 110B may send textual and/or graphical prompts to the mobile device. In some embodiments, for example where the smart headset 118 is equipped with pico projectors for projecting keyboards, and the modified input method includes a projected keyboard, contextual privacy program 110A, 110B may use cameras including, for example, a camera mounted on smart headset 118 in line with the facing of the smart headset 118, to locate and identify a viewing angle at which to project a virtual keyboard such that the keys of the keyboard are visible and clear to the user.

In some embodiments of the invention, the contextual privacy program 110A, 110B may highlight one or more people and/or devices in the surroundings of the user that pose privacy risks using one or more augmented-reality graphical and/or textual elements, and may further use augmented reality graphical elements to represent the visual or auditory perception of the person or devices in the surrounding environment of the smart headset 118, such as by representing the cone of vision, facing direction, hearing range, et cetera of the people or devices graphically within a virtual world. The user may communicate with the contextual privacy program 110A, 110B, for example via gesture or speech, to identify highlighted individuals, and/or adjust or remove the privacy risk of the one or more highlighted individuals or devices. In some embodiments, the contextual privacy program 110A, 110B may overlay one or more augmented-reality graphical elements, such as colored rings or boundaries, delineating the one or more threshold distances around the smart headset 118 corresponding with one or more input/output methods onto the real-world environment of the user, and may graphically represent changes, such as different colors, color intensities, shapes, animations, et cetera, to the graphical elements based on whether and/or how many people or devices representing privacy risks are within one or more of the threshold distances.

Figure 3:
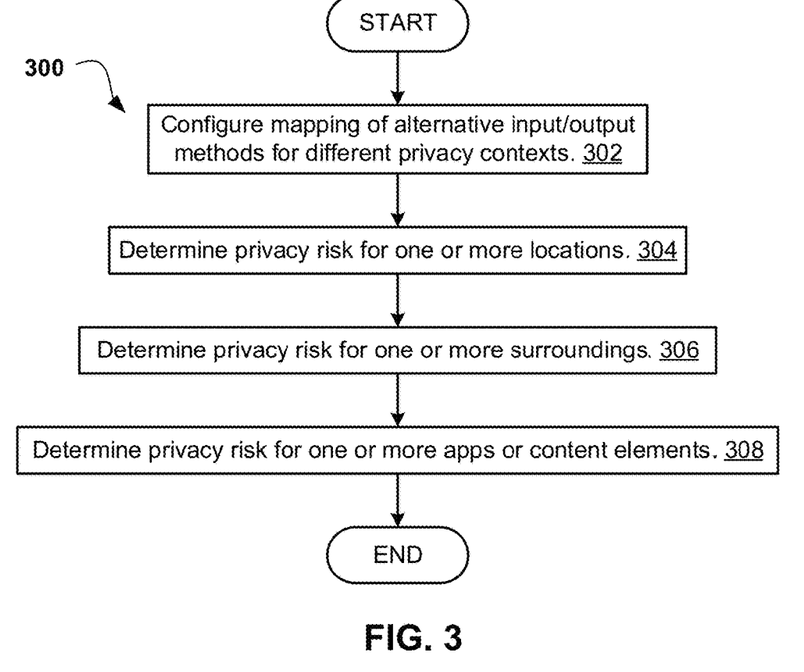
FIG. 3 is an operational flowchart illustrating a configuration sub-process of the contextual privacy process according to at least one embodiment.

Referring now to FIG. 3, an operational flowchart illustrating a configuration sub-process 300 of the contextual privacy process 200 is depicted according to at least one embodiment. The configuration sub-process 300 may be a process that generates configurations settings, which may be a list of privacy contexts, mappings of input/output methods, and privacy risk associated with locations, surroundings, and content. At 302, the contextual privacy program 110A, 110B configures a mapping of alternative input and/or output methods for differing privacy contexts. The privacy contexts may be generated by contextual privacy program 110A, 110B, selected from a database based on the input/output capabilities of the smart headset 118, or pre-provided by a software agent or user. A privacy context may be a representation of a real world scenario, either hypothetical or actual, that may be encountered during operation of contextual privacy program 110A, 110B; a privacy context comprises values of the three categories of privacy risk; the location privacy risk, the surrounding privacy risk, and the content privacy risk, as well as input and output capabilities of a smart headset 118, and details of the scenario that determines the security of the input/output capabilities, such as the presence of people or devices and whether they have line of sight on smart headset 118, how far they are from the smart headset 118, capabilities of devices (microphone equipped or camera equipped), et cetera; For example, one privacy context might represent a scenario where the smart headset has a microphone and camera as input capabilities, and a display and speaker as output capabilities; the location is the user's house so the location risk is 1 (low risk), the surroundings include a visiting acquaintance so the surroundings privacy risk is 2 (medium risk), and the content is confidential work information so the content privacy risk is 3 (high risk); lastly, the visiting acquaintance is in another room but is visible to the user.

Smart headsets 118 may be equipped with a range of different input/output capabilities; smart headsets 118 equipped with speakers and displays can communicate with users via audible speech and text/graphical elements as output capabilities. Where the smart headsets 118 or connected computing devices are equipped with augmented-reality software, smart headsets 118 may display augmented reality graphical elements to a user. Where the smart headsets 118 or supporting computing devices are equipped with noise cancellation software, smart headsets 118 may use noise cancelling to enhance the privacy of audible speech output and input. Smart headsets 118 equipped with microphones and cameras may accept audible speech and gestures as input methods. In some embodiments, a smart headset 118 may be paired with a mobile device such as a phone, laptop, smart watch, etc. which can be available as an alternative text input mechanism. Likewise, some smart headsets 118 may be equipped with a pico projector capable of projecting a keyboard and using a camera to identify which buttons are being pressed by the user.

Different input methods are more or less suitable in different privacy contexts. For example, speech and gestures are convenient and intuitive, and therefore may be best suited to scenarios where privacy risk is low, and may therefore work well as default input methods. However, once privacy risk exceeds a threshold amount, the security of the different input and output methods for the given privacy context must be evaluated. Where people and camera-equipped devices are far away but in view of the headset 118, gestures may no longer be secure since they can be seen, but whispered speech may be secure because nobody is near enough to hear it. Conversely, gestures may be preferred when people are within earshot but do not have line of sight on the smart headset 118. Keyboards may be best suited for scenarios where contextual privacy program 110A, 110B determines the current method of input (ie. voice) is not secure due to people or devices within earshot, but no people or devices are close enough or have line of sight to compromise the privacy of a keyboard, or where a keyboard could easily be shielded from view. Where the pico projector can project three-dimensional holographic walls in the air, contextual privacy program 110A, 110B may project walls to hide keyboards and hand gestures from view, such input methods may be secure even where people or devices are nearby. Output methods may likewise be situational; if people or devices are within earshot, speech or audio may not be secure, unless the smart headset 118 is equipped or paired with headphones, and text on the display might be more secure. Security of a given input and output method for preserving privacy within a given privacy context or general class of privacy contexts may be determined based on user feedback, machine learning models, historical data, et cetera.

Configuring a mapping of alternative input and/or output methods for differing privacy contexts may include assigning one or more input and/or output methods to each privacy context. The input and output methods corresponding with a given privacy context may be selected by contextual privacy program 110A, 110B based on security, and/or may be selected by a user. The user may alternatively or additionally choose input output methods for privacy contexts based on personal preference or other considerations. The privacy contexts may be tailored to the input/output capabilities of the user's smart headset 118, and may represent all or some subset of likely scenarios. The user may select input/output mappings for all privacy contexts, or for a subset of privacy contexts; if the user selects input/output mappings for a subset of privacy contexts, contextual privacy program 110A, 110B may map the rest based on suitability, or may prompt the user to select defaults or broad rules for input/output mappings to apply to the rest. In some embodiments of the invention, where contextual privacy program 110A, 110B encounters a privacy context with no input/output mapping, contextual privacy program 110A, 110B may prompt the user for a mapping.

At 304, the contextual privacy program 110A, 110B may determine a privacy risk for one or more locations. The contextual privacy program 110A, 110B may prompt the user to define the risk associated with specific or general locations. The user may predefine locations that are safe from a privacy perspective, such as home, home office, car, office at work, et cetera. The user may provide additional information identifying and defining the location, such as map coordinates, or contextual privacy program 110A, 110B may fill in additional information and seek user feedback on whether the additional information is correct. The contextual privacy program 110A, 110B may record the list of locations, and their identifying information and assigned privacy risks, in the configuration settings.

At 306, the contextual privacy program 110A, 110B may determine a surroundings risk for one or more surroundings. The contextual privacy program 110A, 110B may create a list of people and devices, and/or classes of people or classes of devices, and corresponding surroundings risks. The contextual privacy program 110A, 110B may prompt the user to predefine people or objects likely to be encountered within the user's surroundings to assign a privacy risk to each. The user may, for example predefine people who are safe from a privacy perspective, such as family members, friends, work colleagues, trusted associates, et cetera. The user may provide additional information identifying people, such as voice clips or pictures of their faces, or contextual privacy program 110A, 110B may associate information with people based on user feedback. The user may assign privacy risk to classes of devices, such as cameras or microphones, or devices containing cameras or microphones. The contextual privacy program 110A, 110B may identify cameras or microphones by comparing devices in a camera feed against a database of devices equipped with cameras and/or microphones. The contextual privacy program 110A, 110B may record the list of people and devices, and their identifying information and assigned privacy risks, in the configuration settings.

At 308, the contextual privacy program 110A, 110B may determine a content risk for one or more applications or content items. The contextual privacy program 110A, 110B may prompt a user to define a content risk for one or more applications or one or more content items, and/or to assign rules governing general classes of application or content item. The applications may be any software programs or services with graphical, audio and/or gesture-based user interfaces that the user might access on the smart headset 118. The content items may be any media that the user might access on the smart headset 118, including webpages, pictures, videos, et cetera. The contextual privacy program 110A, 110B may record the list of applications and content elements, and their identifying information and assigned privacy risks, in the configuration settings.

Figure 4:
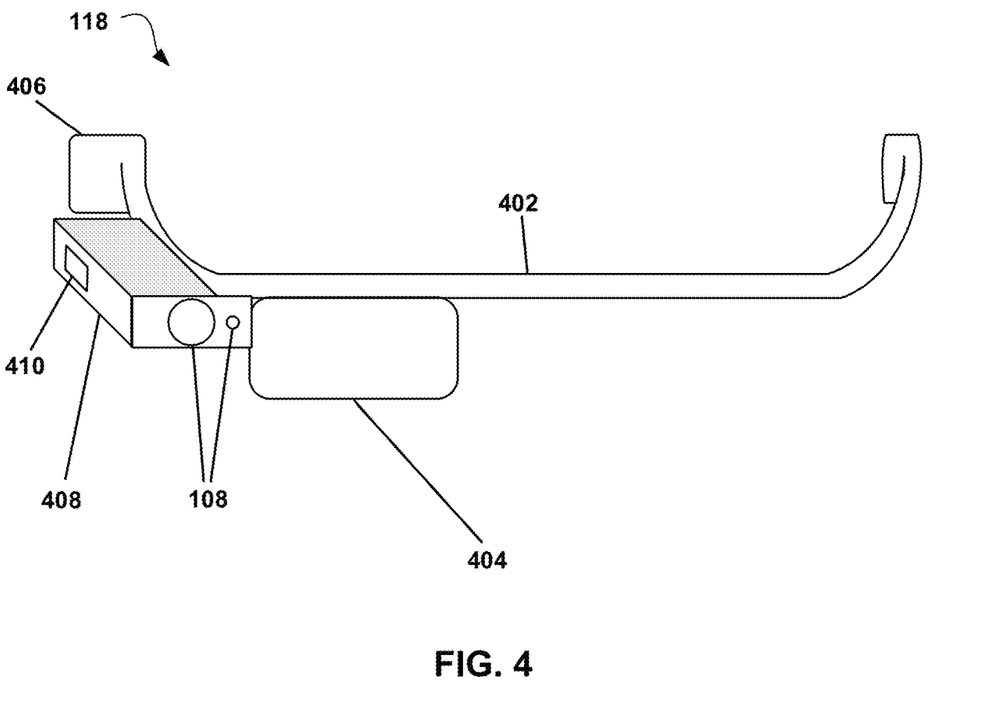
FIG. 4 is a diagram of an exemplary smart headset according to at least one embodiment.

Referring now to FIG. 4, a diagram of an exemplary smart headset 118 is depicted according to at least one embodiment. Smart headset 118 comprises a headband 402, which secures the smart headset 118 to the head of the user. The smart headset 118 may be equipped with a display 404 attached to the headband and here disposed over the eye of the user. Display 404 may be a traditional opaque display. In some embodiments, the display 404 may be transparent or substantially transparent, allowing a user to see through the display to the environment on the other side, and allowing contextual privacy program 110A, 110B to overlay AR graphical elements onto real-world locations or objects. Smart headset 118 may comprise integrated sensors 108 such as a camera and microphone, and may comprise a power source 406 attached to headband 402. Smart headset 118 may further include a housing 408 that is attached to headband 402 may contain a processor 104 or data storage device 106, and one or more speakers 410, which may be configured for noise-cancelling. Housing 408 may further contain additional hardware such as a wireless transceiver compatible with Wi-Fi or Bluetooth and/or other communications formats, a global positioning system, a pico projector capable of projecting a keyboard and/or three-dimensional holographic walls, et cetera.

Figure 5:
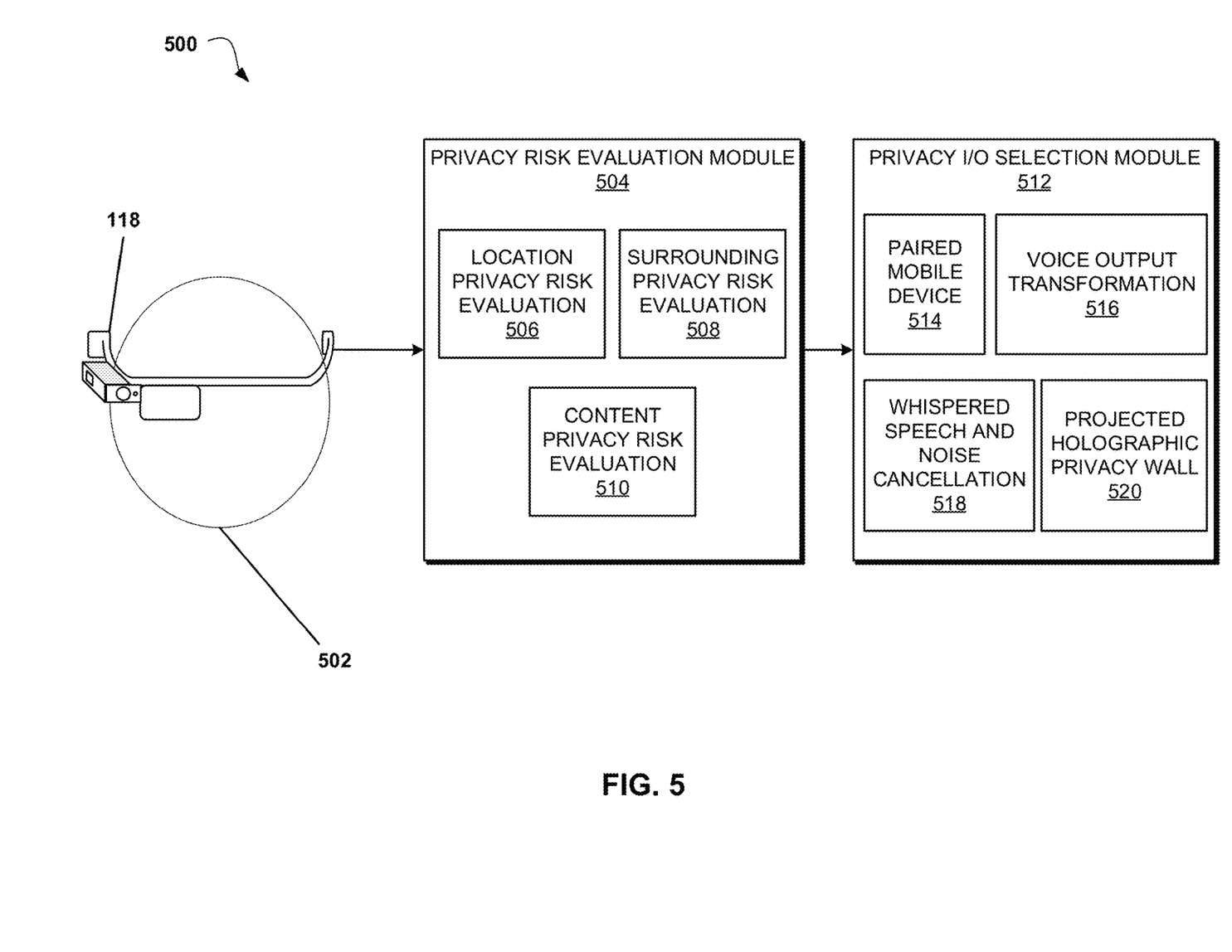
FIG. 5 is a high-level component diagram illustrating a contextual privacy system according to at least one embodiment.

Referring now to FIG. 5, a high-level component diagram illustrating a contextual privacy system 500 is depicted according to at least one embodiment. Here, a user 502 wearing a smart headset 118 is depicted. The smart headset 118 communicates data from sensors 108 regarding the location and surroundings of smart headset 118, and the content and applications being accessed by user 502 on smart headset 118, as input to the privacy risk evaluation module 504; privacy risk evaluation module 504 performs location privacy risk evaluation 506, surroundings privacy risk evaluation 508, and content privacy risk evaluation 510 by interpreting the data from smart headset 118 to identify the location privacy risk, the surroundings privacy risk, and the content privacy risk. The privacy risk evaluation module 504 then provides the privacy risk and privacy context determined from the data as input to privacy I/O selection module 512, which, based on the privacy risks and the privacy context, selects the appropriate input and output methods to ensure privacy when interacting with the smart headset 118 and supporting devices, for instance by selecting input/output methods including paired mobile device 514, voice output transformation 516, whispered speech and noise cancellation 518, and projected holographic privacy wall 520.

It may be appreciated that FIGS. 2-5 provide only illustrations of individual implementations and do not imply any limitations with regard to how different embodiments may be implemented. Many modifications to the depicted environments may be made based on design and implementation requirements.

Figure 6:
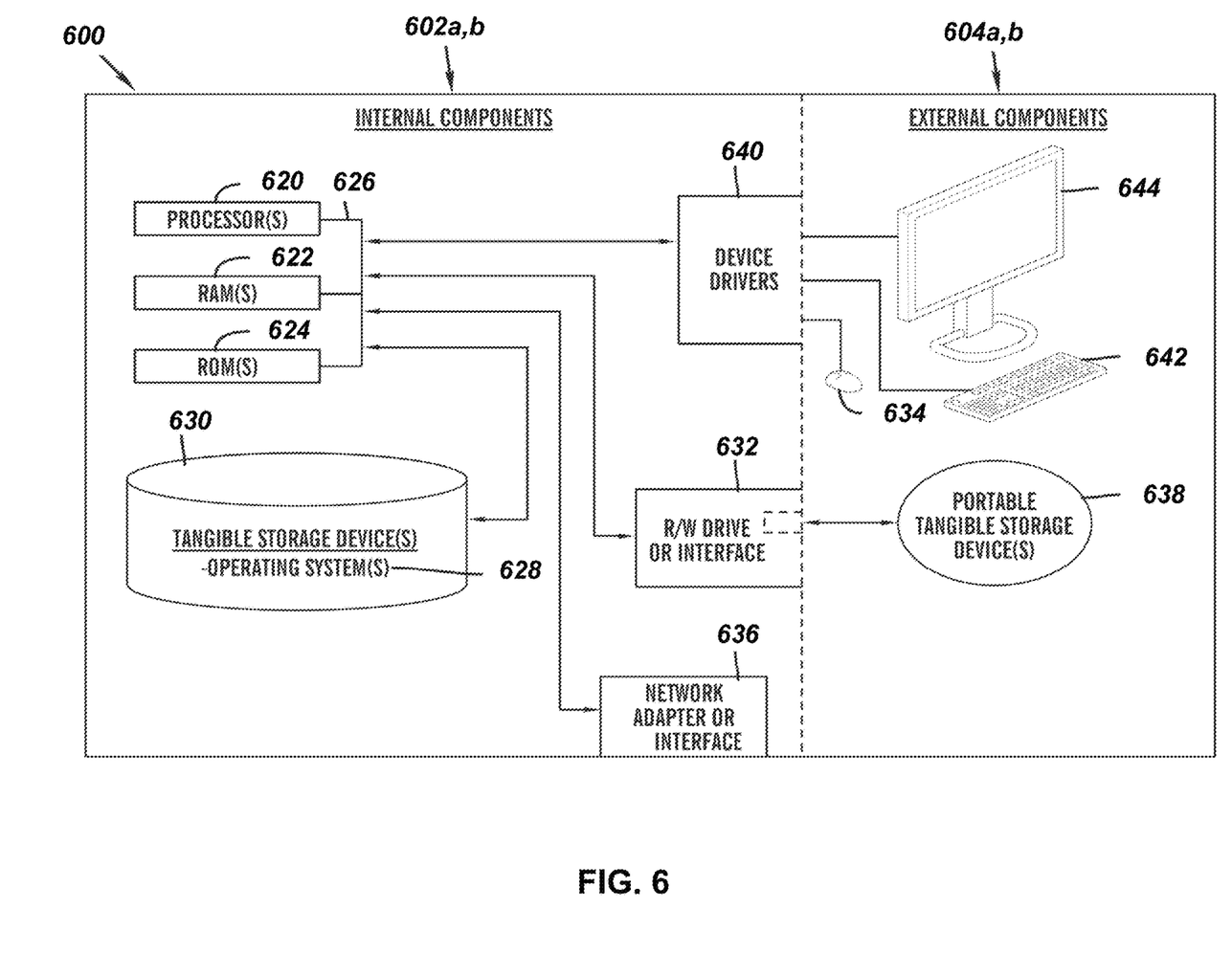
FIG. 6 is a block diagram of internal and external components of computers and servers depicted in FIG. 1 according to at least one embodiment.

FIG. 6 is a block diagram 600 of internal and external components of the client computing device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 602a,b and external components 604a,b illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628, the contextual privacy program 110A in the client computing device 102, and the contextual privacy program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the contextual privacy program 110A, 110B, can be stored on one or more of the respective portable computer-readable tangible storage devices 638, read via the respective R/W drive or interface 632, and loaded into the respective hard drive 630.

Each set of internal components 602a,b also includes network adapters or interfaces 636 such as a TCP/IP adapter cards, wireless Wi-Fi interface cards, or 3G or 4G wireless interface cards or other wired or wireless communication links. The contextual privacy program 110A in the client computing device 102 and the contextual privacy program 110B in the server 112 can be downloaded to the client computing device 102 and the server 112 from an external computer via a network (for example, the Internet, a local area network or other, wide area network) and respective network adapters or interfaces 636. From the network adapters or interfaces 636, the contextual privacy program 110A in the client computing device 102 and the contextual privacy program 110B in the server 112 are loaded into the respective hard drive 630. The network may comprise copper wires, optical fibers, wireless transmission, routers, firewalls, switches, gateway computers and/or edge servers.

Each of the sets of external components 604a,b can include a computer display monitor 644, a keyboard 642, and a computer mouse 634. External components 604a,b can also include touch screens, virtual keyboards, touch pads, pointing devices, and other human interface devices. Each of the sets of internal components 602*a,b* also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
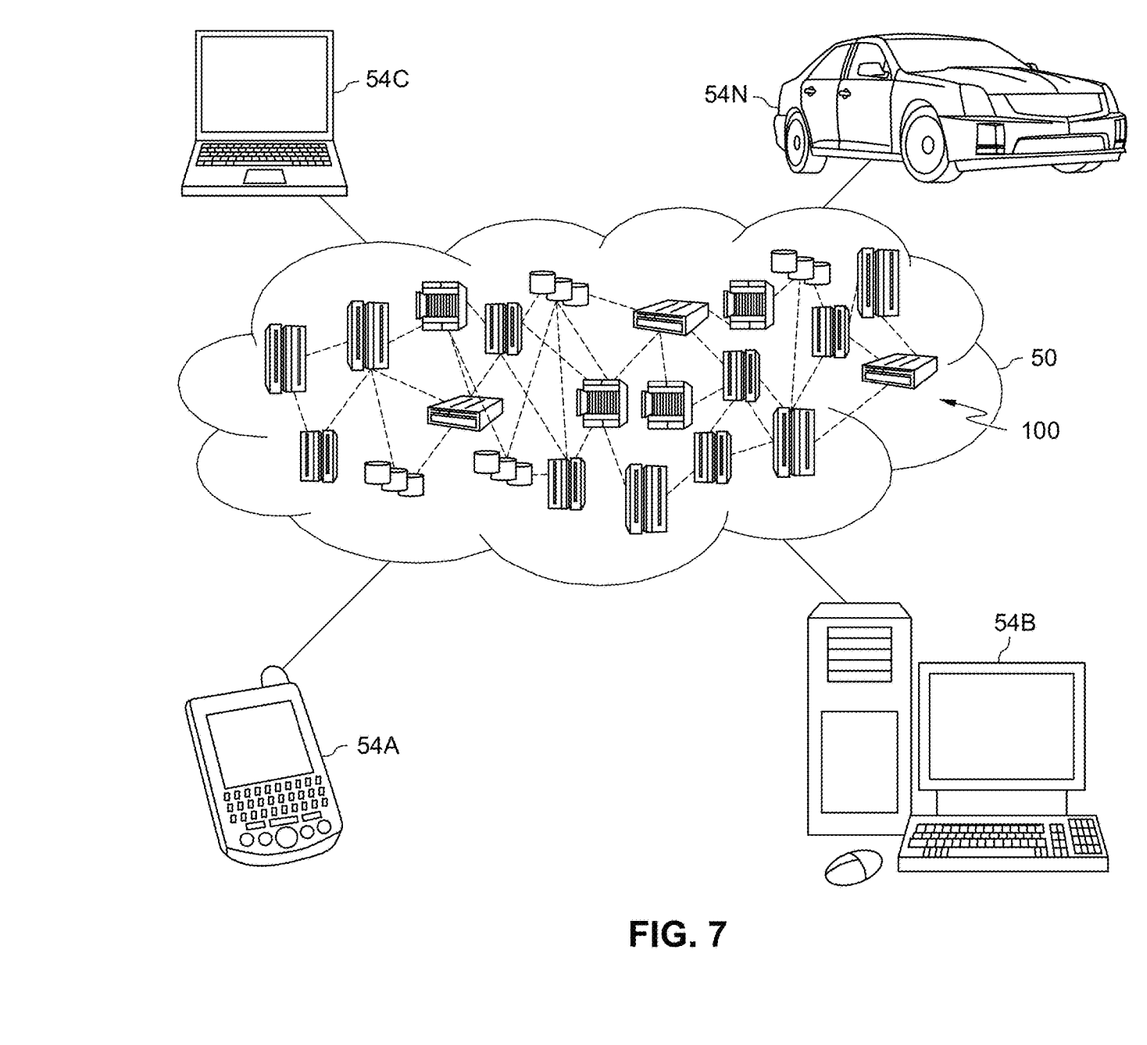
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
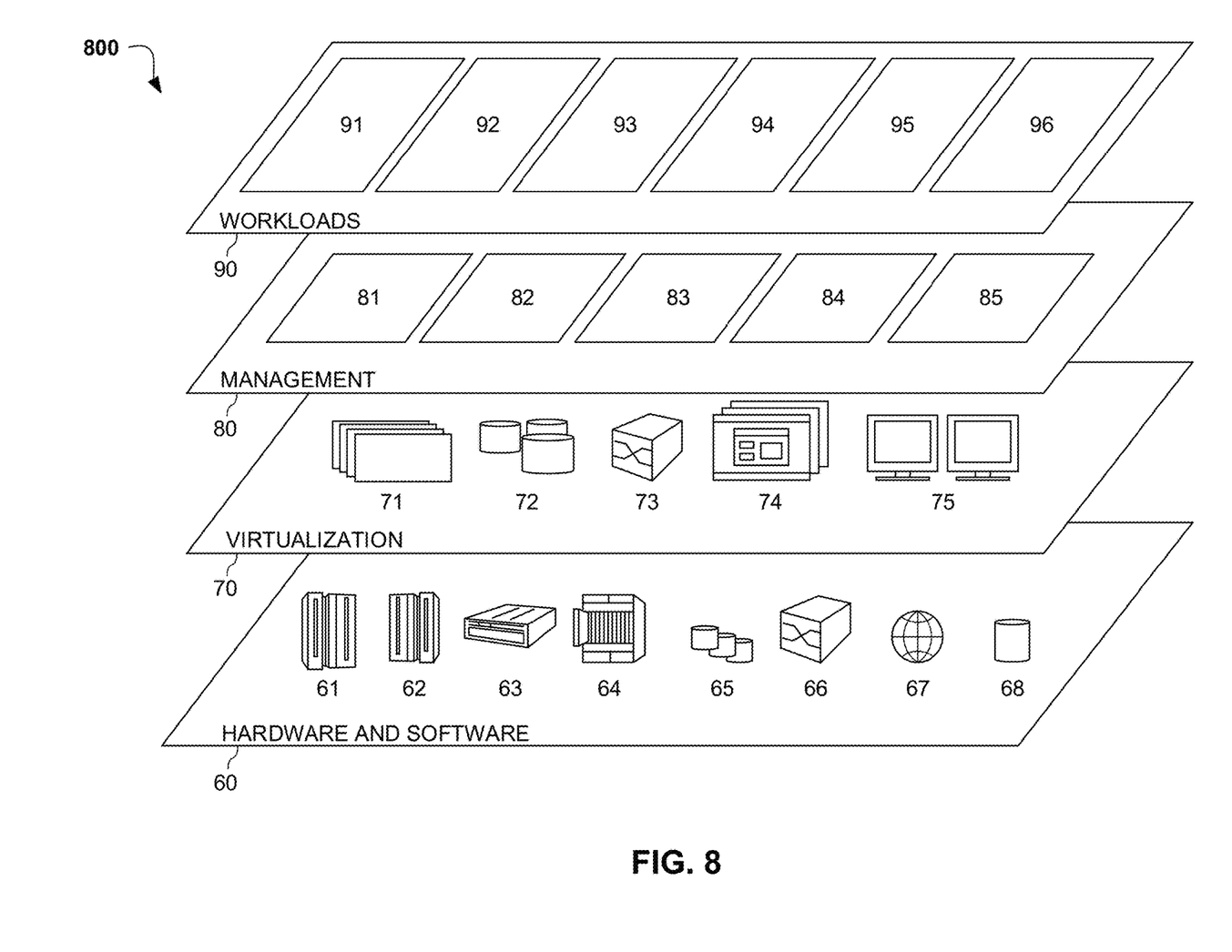
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual privacy 96. The contextual privacy 96 may be enabled to select a method for interaction between a user and a smart headset based on a dynamic assessment of the privacy risk associated with the user's location, people or objects in the environment, and content being accessed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for selecting user interface methods for a smart headset, the method comprising:
    determining a privacy context of the smart headset;
    responsive to a privacy risk comprising the privacy context exceeding a threshold amount, inferring, based on the privacy context, a security of a plurality of input methods and a plurality of output methods that comprise interface capabilities of the smart headset, wherein the privacy context comprises a location privacy risk, a surroundings privacy risk, and a content privacy risk;
    selecting at least one output method of the plurality of output methods and at least one input method of the plurality of input methods based on the security, wherein the plurality of input methods comprise text input from a projected virtual keyboard;
    operating the smart headset to interface with a user using the at least one selected output method and the at least one selected input method: and
    displaying a visual or audio perception of a person or device posing a privacy risk in the surrounding environment of the smart headset using augmented reality graphical elements.

2. The method of claim 1, further comprising:
    highlighting one or more people or one or more devices representing a privacy risk within the surrounding environment of the smart headset using one or more augmented reality graphical elements.

3. The method of claim 1, further comprising;
    displaying, to a user wearing the smart headset, one or more objects comprising one or more fake objects and one or more visible objects, wherein the visible objects are objects within a line of sight of a camera in line with a facing of the smart headset;
    responsive to the user correctly identifying one or more objects, authenticating the user as a human.

4. The method of claim 1, wherein the privacy context is based on one or more objects or one or more devices falling within one or more threshold distances of the smart headset, wherein the one or more threshold distances correspond with one or more input methods and one or more output methods.

5. A computer system for selecting user interface methods for a smart headset, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    determining a privacy context of the smart headset;
    responsive to a privacy risk comprising the privacy context exceeding a threshold amount, inferring, based on the privacy context, a security of a plurality of input methods and a plurality of output methods that comprise interface capabilities of the smart headset, wherein the privacy context comprises a location privacy risk, a surroundings privacy risk, and a content privacy risk;
    selecting at least one output method of the plurality of output methods and at least one input method of the plurality of input methods based on the security, wherein the plurality of input methods comprise text input from a projected virtual keyboard;
    operating the smart headset to interface with a user using the at least one selected output method and the at least one selected input method: and
    displaying a visual or audio perception of a person or device posing a privacy risk in the surrounding environment of the smart headset using augmented reality graphical elements.

6. The computer system of claim 5, further comprising:
    highlighting one or more people or one or more devices representing a privacy risk within the surrounding environment of the smart headset using one or more augmented reality graphical elements.

7. The computer system of claim 5, further comprising:
displaying, to a user wearing the smart headset, one or more objects comprising one or more fake objects and one or more visible objects, wherein the visible objects are objects within a line of sight of a camera in line with a facing of the smart headset;
responsive to the user correctly identifying one or more objects, authenticating the user as a human.

8. The computer system of claim 5, wherein the privacy context is based on one or more objects or one or more devices falling within one or more threshold distances of the smart headset, wherein the one or more threshold distances correspond with one or more input methods and one or more output methods.

9. A computer program product for selecting user interface methods for a smart headset, the computer program product comprising:
one or more computer-readable tangible storage medium and program instructions stored on at least one of the one or more tangible storage medium, the program instructions, when executed by a processor, cause the processor to perform a method comprising:
determining a privacy context of the smart headset;
responsive to a privacy risk comprising the privacy context exceeding a threshold amount, inferring, based on the privacy context, a security of a plurality of input methods and a plurality of output methods that comprise interface capabilities of the smart headset, wherein the privacy context comprises a location privacy risk, a surroundings privacy risk, and a content privacy risk;
selecting at least one output method of the plurality of output methods and at least one input method of the plurality of input methods based on the security, wherein the plurality of input methods comprise text input from a projected virtual keyboard;
operating the smart headset to interface with a user using the at least one selected output method and the at least one selected input method: and
displaying a visual or audio perception of a person or device posing a privacy risk in the surrounding environment of the smart headset using augmented reality graphical elements.

10. The computer program product of claim 9, further comprising:
highlighting one or more people or one or more devices representing a privacy risk within the surrounding environment of the smart headset using one or more augmented reality graphical elements.

11. The computer program product of claim 9, further comprising:
displaying, to a user wearing the smart headset, one or more objects comprising one or more fake objects and one or more visible objects, wherein the visible objects are objects within a line of sight of a camera in line with a facing of the smart headset;
responsive to the user correctly identifying one or more objects, authenticating the user as a human.

12. The computer program product of claim 9, wherein the privacy context is based on one or more objects or one or more devices falling within one or more threshold distances of the smart headset, wherein the one or more threshold distances correspond with one or more input methods and one or more output methods.

* * * * *